Dec. 30, 1930.  A. C. HAYDEN  1,787,270
STAND FOR MOTION PICTURE PROJECTOR APPARATUS
Filed Sept. 27, 1926  4 Sheets-Sheet 1
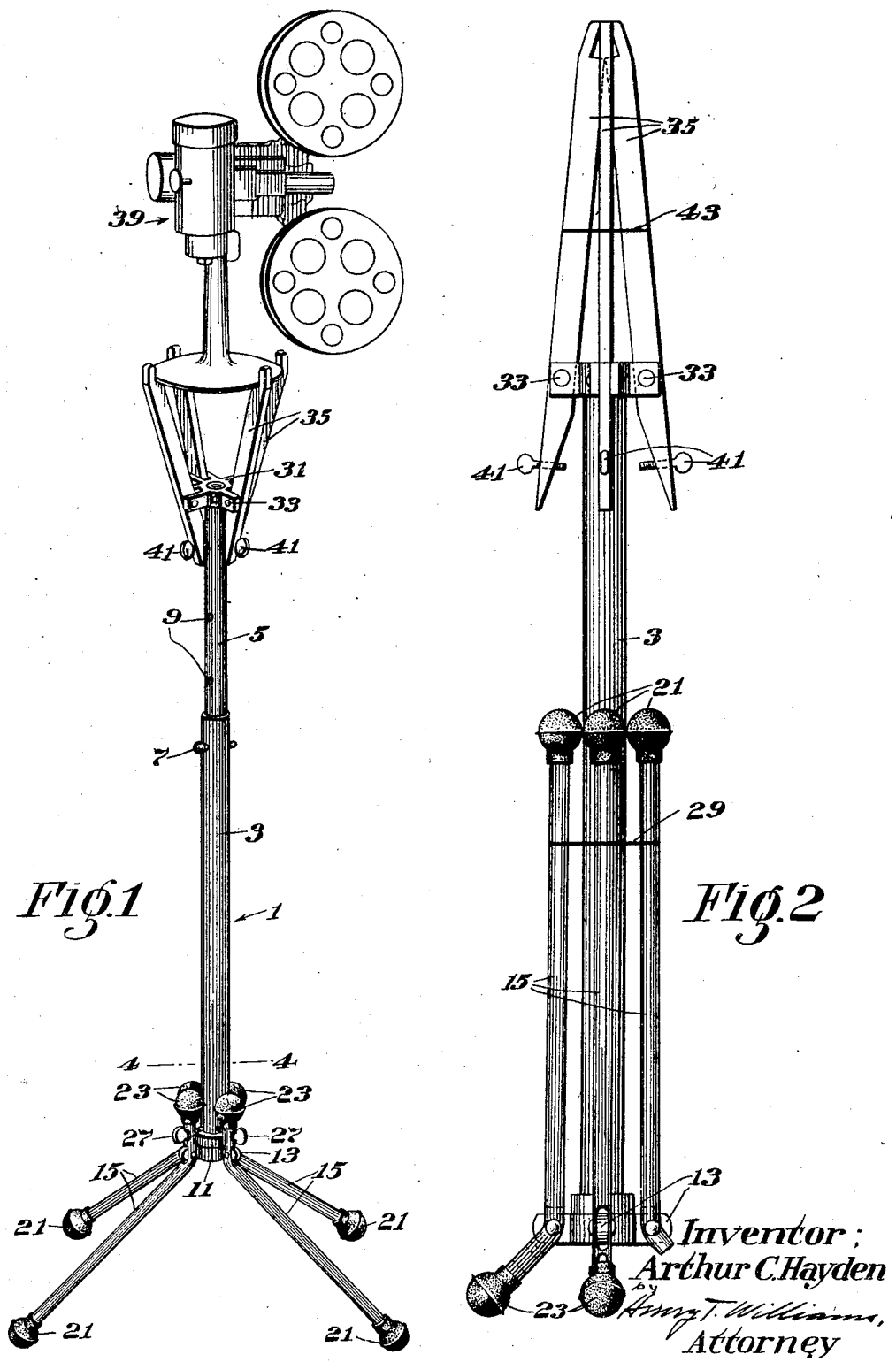

Dec. 30, 1930.  A. C. HAYDEN  1,787,270
STAND FOR MOTION PICTURE PROJECTOR APPARATUS
Filed Sept. 27, 1926   4 Sheets-Sheet 2

Inventor
Arthur C. Hayden
by Henry T. Williams,
Attorney

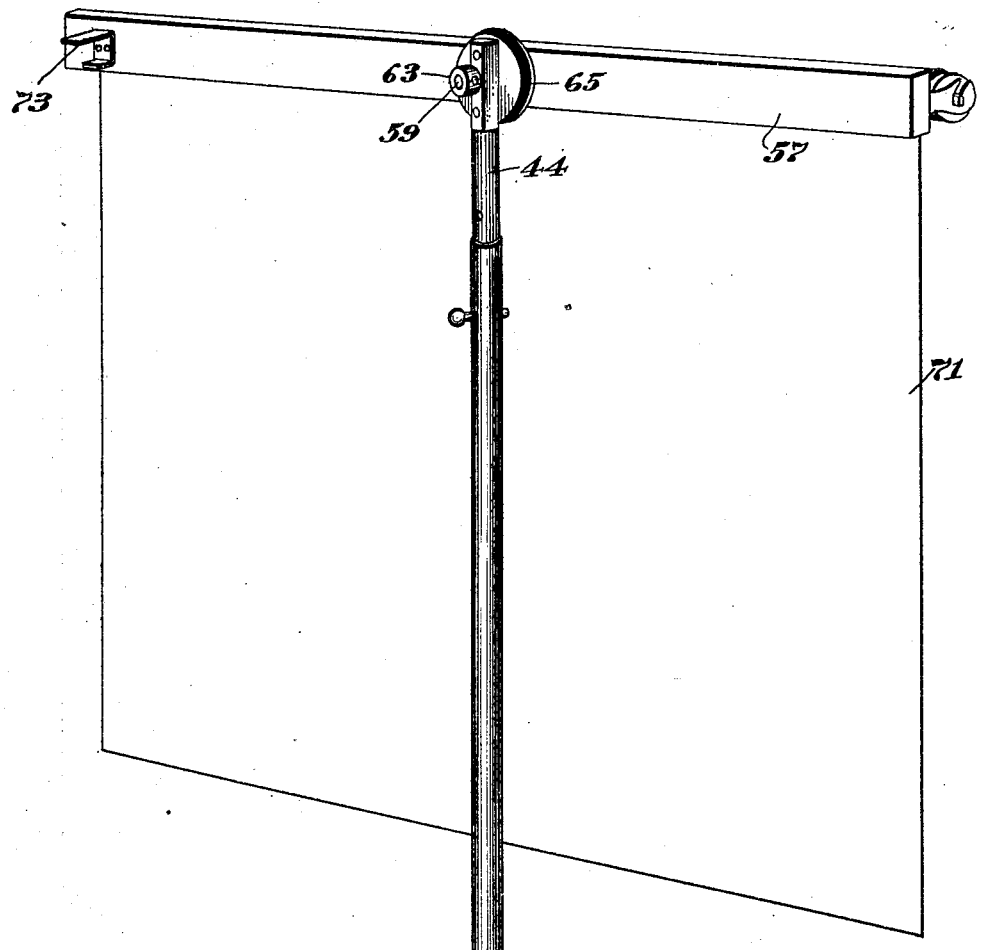
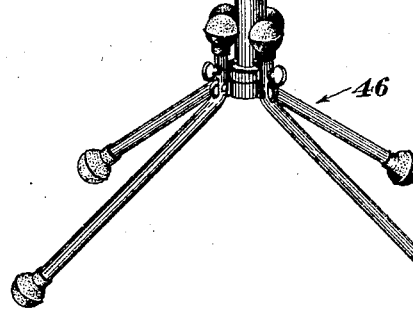

Dec. 30, 1930.   A. C. HAYDEN   1,787,270
STAND FOR MOTION PICTURE PROJECTOR APPARATUS
Filed Sept. 27, 1926   4 Sheets-Sheet 4
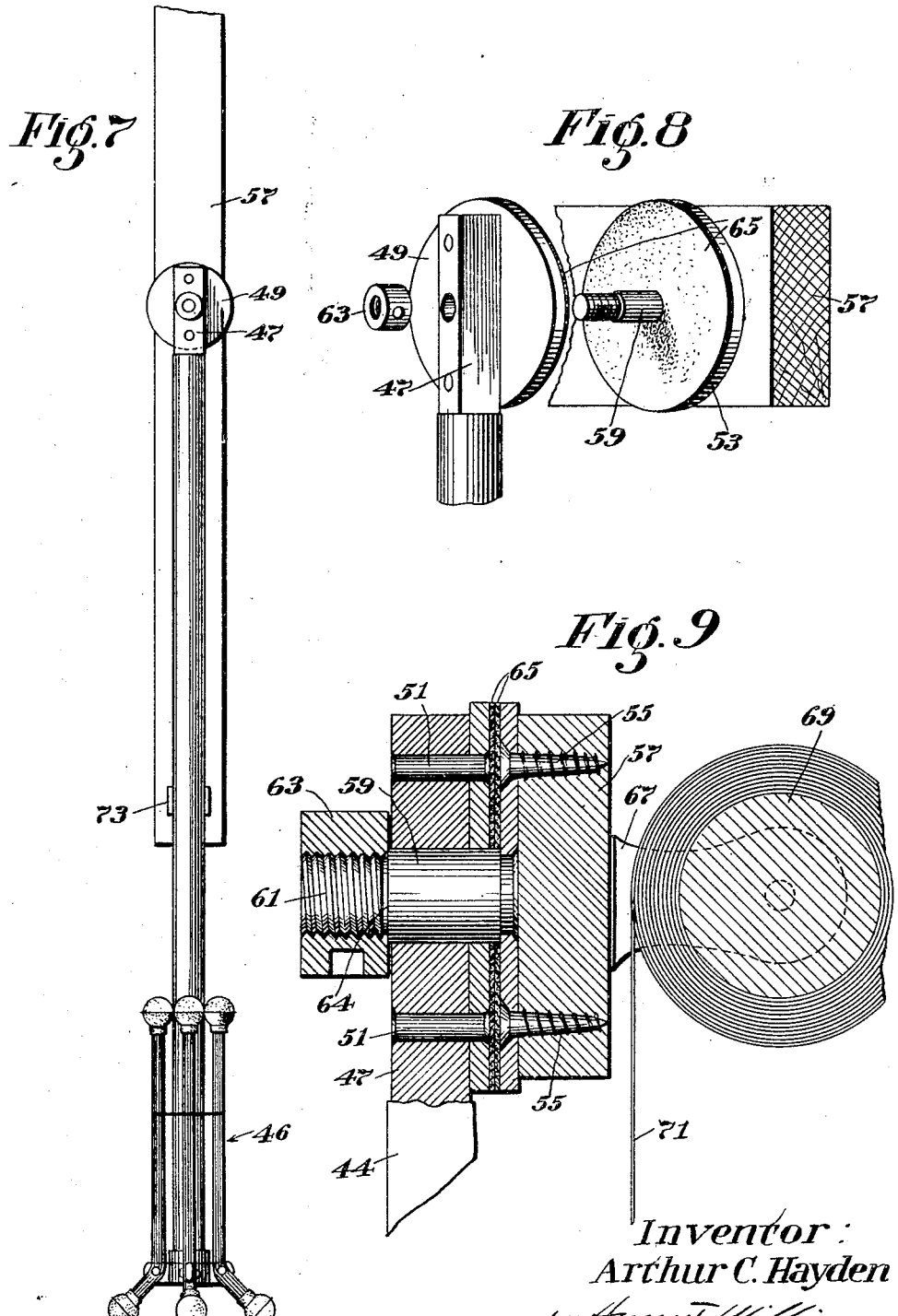
Inventor:
Arthur C. Hayden
by Amy T. Williams,
Attorney Patented Dec. 30, 1930

1,787,270

UNITED STATES PATENT OFFICE

ARTHUR C. HAYDEN, OF BROCKTON, MASSACHUSETTS

STAND FOR MOTION-PICTURE-PROJECTOR APPARATUS

Application filed September 27, 1926. Serial No. 137,858.

The invention to be hereinafter described relates to motion picture projector apparatus, and more particularly to stands for supporting the projector and screen.

Heretofore, in setting up motion picture projector apparatus, difficulty and inconvenience have been experienced in obtaining desirable and proper support for the projector and screen, and this has been particularly true where the apparatus is set up for temporary use in homes and halls. One of the purposes of the present invention, therefore, is to provide stands which may be quickly and easily set up to support the projector and screen in proper relation and with the stability required; another purpose is to provide stands which may be adjusted so as to have a secure grip on the floor; and still another purpose is to provide stands having parts which may be adjusted into collapsed relation and occupy a small amount of space so that they can conveniently be carried from place to place.

With the aforesaid and other purposes in view, the character of the invention will be best understood by reference to the following description and the accompanying drawings, wherein:

Fig. 1 is a perspective view of a stand embodying the invention and adapted for supporting a motion picture projector;

Fig. 2 on an enlarged scale is a view of the stand showing the parts in collapsed relation;

Fig. 6 is a perspective view of a stand embodying the invention and adapted for supporting the screen;

Fig. 7 is a view of the stand shown in Fig. 6 with the parts in collapsed relation;

Fig. 8 is a perspective view of separated parts of the device for pivotally connecting the screen carrying bar with the post of the stand; and Fig. 9 on an enlarged scale is a vertical section through the upper end portion of the post, the bar and the screen roller.

Figure 3:
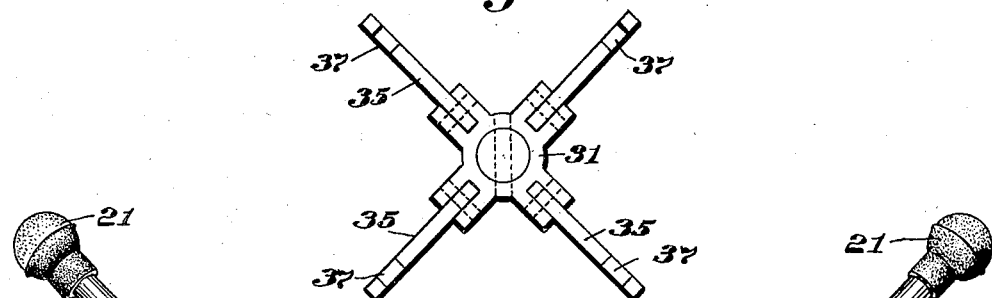
Fig. 3 is a plan of the upper end of the stand.

Referring to the drawings, and more particularly to Figs. 1 to 5, the stand shown therein as one good form of the invention, comprises a post 1 having tubular lower and upper members 3 and 5 in telescoping relation. The lower member 3 carries a pin 7 which is adapted to enter any one of the holes 9 in the upper member, thereby to hold the latter in different positions of vertical adjustment.

The post is provided with a base comprising a ring 11 threaded to the lower end of the post and having outstanding lugs 13 entered through slots in four legs 15 which are pivotally connected by pins 17 with the lugs. The legs have short arms 19 extending at obtuse angles with respect to the lower portions of the legs. Rubber balls or tips 21 are provided on the lower ends of the legs, and rubber balls or tips 23 are provided on the upper ends of the arms. The arms extend along the post and their tips are adapted to engage and press against the post, thereby to limit outward spread of the legs. Screws 27 may be entered through holes in the arms and be threaded to the post to lock the ring to the post and also to draw the arms toward the post, hold the legs in the positions to which they are adjusted, and thereby stiffen the connection of the post with the legs.

Figure 4:
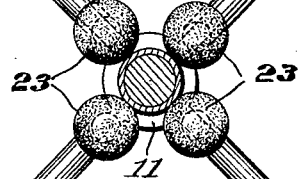
Fig. 4 is a horizontal section taken on line 4—4 of Fig. 1.
Figure 5:
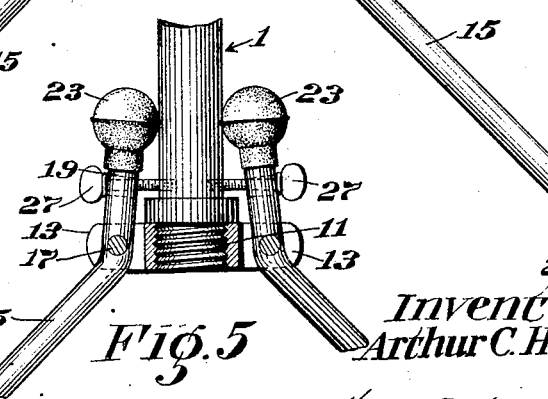
Fig. 5 is a view of a portion of the lower end of the stand, the ring being shown in section.

When the stand is set up, the legs may have the relation to one another and to the post shown in Figs. 1, 4 and 5. When it is desired to collapse the legs, the ring 11 is unscrewed from the post and inverted and then screwed back onto the post so that the legs 15 may extend along and in overlapped relation with respect to the post, as shown in Fig. 2. A rubber band 29 or other securing means may be provided to hold the legs in their collapsed position.

Secured to the top of the upper member 5, referred to, is a head 31 having forks receiving pins 33 on which arms 35 are pivoted at points intermediate the ends of the arms. The tips of the arms have notches or shoulders 37 on which the disk shaped base of a usual motion picture projector 39 may rest. Adjacent the lower ends of the arms and threaded thereto are screws 41 adapted for engagement with the upper member 5. These screws may be adjusted to properly limit the outward rocking movement of the arms on their pivot pins, and said screws may be set up so that the arms will press against and grip the projector base. Also, by adjusting said screws the projector may be levelled or tilted to different positions of angular adjustment. When the stand is not employed to support the projector, the arms 35 may be rocked inward toward one another into their collapsed relation shown in Fig. 2, and they may be so secured by a rubber band 43. The upper member 5 may be thrust into the lower member 3 until limited by engagement of the head 31 with the top of the lower member 3, thereby to reduce the overall length of the stand as much as possible.

An important feature of the stand is the construction and action of the legs of the base having rubber balls at the lower ends of the legs and at the upper ends of the arms of the legs. In setting up the stand after the legs have been spread apart, the post is grasped and thrust downward thereby causing the balls at the tips of the arms to be compressed against the post. This will produce a slight outward rocking of the arms and since the legs are pivoted intermediate their ends, they will be drawn inward slightly and compress the balls at the lower ends of the legs against the floor and cause them to wipe slightly along the floor toward one another. As a consequence of the compression of the balls at the upper ends of the arms and at the lower ends of the legs, the latter will obtain a secure grip on the floor which is important in contributing to the stability of the stand. The lengths of the arms above the pivotal points of the legs are relatively short as compared to the lengths of the legs beneath said points. As a consequence, when the post is thrust down, the balls on the arms will be susceptible of the independent compression against the post, and slight movement of the balls on the arms toward the post will be multiplied at the balls on the lower ends of the legs, and proper engagement of said balls with the floor to secure stability of the stand will be insured. After the post has been thrust down to produce the action described, the screws entered through the arms are set up so as securely to hold the arms and legs in the positions to which they have been adjusted, thereby to maintain the grip of the legs on the floor. These screws may be differentially adjusted to bring the post to a vertical position or to an inclined position if desired.

Referring now more particularly to Figs. 6 to 9, the stand shown therein for supporting the screen comprises telescoping members 44 and 45 and a base 46 similar to corresponding parts of the projector supporting stand described, but the upper member of the post is specially constructed to support the motion picture screen. To accomplish this, in the present instance of the invention, the upper portion 47 (Figs. 7 and 8) of the post is made square in section and has a disk 49 secured thereto by rivets 51 (Fig. 9). A disk 53 is secured by screws 55 to an elongated bar 57 and projecting from said disk is a stud 59 having a reduced threaded end portion 61. This stud extends through registering holes in the disk 49 and the upper portion 47 of the post and is secured thereto by a nut 63 threaded on the stud. This nut is adapted to be tightened into engagement with the shoulder 64 at the junction of the threaded portion 61 with the shank of the stud 59 so that the nut will not be loosened by rotative adjustment of the stud. The disks may be provided with leather friction facings 65. The construction is such that the bar may be frictionally held in different positions of angular adjustment with respect to the post.

Mounted on the bar 57 are brackets 67 carrying a roller 69 to which is secured the upper margin of the motion picture screen 71. The roller and brackets are similar to the usual shade roller and brackets, the construction being such that the screen may be unrolled to the extent desired and may be rolled up when not in use.

Adjacent one end of the bar is a spring clip 73 adapted to clasp the post and hold the bar in parallel relation with the post when the screen is not in use. The ring carrying the legs of the post may be removed, inverted and screwed onto the post so that the legs may lie along the post in collapsed relation as appears in Fig. 7.

It will be understood that the invention is not limited to the specific embodiments shown, and that various deviations may be made therefrom without departing from the spirit and scope of the appended claims.

What is claimed is:

1. A stand comprising a post, legs pivotally connected intermediate their ends to the post and having arms adapted to extend along the post, and rubber tips for the arms adapted to engage and be compressed against the post thereby to limit outward spread of the legs and stabilize the post.

2. A stand comprising a post, a ring at the lower end of the post, legs pivotally connected to the ring and having arms adapted to extend along the post, and screws entered through holes in the arms and threaded to the ring for drawing the arms toward the post.

3. A stand comprising a base, a post rising therefrom, arms pivotally connected to the upper end of the post and adapted for supporting a motion picture projector or the like, said arms having portions for engagement with the post to limit outward spreading of the arms, and screws threaded into the arms for abutting engagement with the post to vary the relation of said arms.

4. A stand comprising a post, four legs pivotally connected to the post at points intermediate the ends of the legs, upper and lower elastic rubber balls at the opposite ends of the legs, the upper balls being adapted to engage and be compressed against the post to limit outward spread of the legs and the balls at the opposite ends of the legs being adapted to be compressed on the floor on downward thrust of the post thereby to cause the lower balls to wipe slightly toward one another and grip the floor.

5. A stand comprising a post, legs pivotally connected to the post and having arms extending up along the post, rubber balls at the tips of the arms, rubber balls at the lower ends of the legs, the balls on the arms being adapted to be compressed against the post and the balls at the lower ends of the legs being adapted to be compressed against the floor on downward thrust of the post, and screws entered through the arms and threaded to the post for locking the arms and legs in positions to maintain the compression of said balls.

6. A stand comprising a post, legs pivotally connected to the post at points intermediate the ends thereof, said legs having arms projecting up along the post, elastic rubber balls at the tips of the arms for engagement with the post, and elastic rubber balls at the lower ends of the legs, all of said balls being adapted to be compressed on downward thrust of the post thereby to cause the balls at the lower ends of the legs to grip the floor and the balls at the upper ends of the arms to stabilize the post.

7. A stand comprising a post, a ring threaded to the lower end of the post, legs pivotally connected to said ring intermediate the ends thereof, said legs having arms projecting up from the ring along the post, rubber balls at the tips of the arms, rubber balls at the lower ends of the legs, all of said balls being adapted to be compressed on downward thrust of the post thereby to cause the balls at the lower ends of the legs to grip the floor and the balls at the upper ends of the arms to stabilize the post, and screws entered through the arms and threaded to the post for securing the arms and legs in the positions to which they are adjusted.

8. A stand comprising a post, four legs pivotally connected to the post at points intermediate the ends of the legs and adjacent the upper ends of the legs providing arms above said points relatively short as compared to the lengths of the legs beneath said points, rubber balls on the arms and on the lower ends of the legs, the balls on the arms being independently compressible against the post on down thrust of the post to insure and equalize engagement of the four legs with the floor, slight movement of the arm balls toward the post being multiplied at the balls on the lower ends of the legs.

ARTHUR C. HAYDEN.